US012632354B2

(12) United States Patent
Kapoor et al.

(10) Patent No.: US 12,632,354 B2
(45) Date of Patent: May 19, 2026

(54) MICROPROCESSOR VALIDATION USING RANDOM PREPACKAGED GENERATED TEST FUNCTIONS AND USER LEVEL SCHEDULER

(71) Applicant: International Business Machines Corporation, Armonk, NY (US)

(72) Inventors: Shakti Kapoor, Austin, TX (US); Nelson Wu, Austin, TX (US); Manoj Dusanapudi, Bangalore (IN); Siva Sundar A, Bangalore (IN); Nandhini Rajaiah, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 18/768,239

(22) Filed: Jul. 10, 2024

(65) Prior Publication Data

US 2026/0017160 A1    Jan. 15, 2026

(51) Int. Cl.
*G06F 11/22* (2006.01)
*G06F 11/26* (2006.01)
*G06F 11/263* (2006.01)

(52) U.S. Cl.
CPC ........ *G06F 11/263* (2013.01); *G06F 11/2236* (2013.01)

(58) Field of Classification Search
CPC .......... G06F 9/3851; G06F 9/52; G06F 11/22; G06F 11/2236; G06F 11/26; G06F 11/263; G06F 11/27
See application file for complete search history.

(56) References Cited

U.S. PATENT DOCUMENTS 12,353,307 B2    7/2025   Mendelson et al.
2004/0093199 A1*  5/2004   Lin ................ G01R 31/318364
                                                    703/19

(Continued)

OTHER PUBLICATIONS

Adir et al. "Threadmill: A post-silicon exerciser for multi-threaded processors." Proceedings of the 48th Design Automation Conference, (2011): pp. 860-865.

(Continued)

*Primary Examiner* — Jacob Petranek
(74) *Attorney, Agent, or Firm* — Cantor Colburn LLP; Edward Wixted

(57) ABSTRACT

A method of microprocessor validation includes creating a plurality of actionable items in a system memory for execution by multiple hardware threads, creating a hardware thread table structure in the system memory, wherein the hardware thread table structure contains the multiple hardware threads, creating a Process Table Structure (PTS) table in the system memory, where the PTS table includes entry points into the plurality of actionable items, creating a re-entrant entry point function (FSCHED) in the system memory to allow the multiple hardware threads to enter the plurality of actionable items, inspecting each of actionable items to identify an inactive actionable item, where if an inactive actionable item is identified, the FSCHED atomically locks the inactive actionable item and a hardware thread enters the inactive actionable item and executes the inactive actionable item until finished, where the FSCHED locks the inactive actionable item and continues searching for inactive actionable items.

20 Claims, 8 Drawing Sheets

(56)                References Cited

U.S. PATENT DOCUMENTS

| | | | | |
|---|---|---|---|---|
| 2006/0218513 | A1* | 9/2006 | Dozorets | G06F 30/33 |
| | | | | 716/106 |
| 2009/0070629 | A1* | 3/2009 | Arora | G06F 11/263 |
| | | | | 714/E11.177 |
| 2009/0222647 | A1* | 9/2009 | Feng | G06F 11/263 |
| | | | | 712/227 |
| 2009/0307468 | A1 | 12/2009 | Choudhury et al. | |
| 2011/0131452 | A1 | 6/2011 | Kumar et al. | |
| 2018/0129577 | A1* | 5/2018 | Dusanapudi | G06F 9/30058 |
| 2023/0333950 | A1* | 10/2023 | Mendelson | G06F 11/263 |

OTHER PUBLICATIONS

Anonymous, "Method and System for Functional Validation of Multicore Processors with an Integrated Self-Generating Testcase Framework," Nov. 15, 2010, An IP.com Prior Art Database Technical Disclosure, IP.com No. IPCOM000201550D, 7 pages.
Anonymous, "Method and tool for measuring test-template variability," May 29, 2013, An IP.com Prior Art Database Technical Disclosure, IP.com No. IPCOM000227917D, 10 pages.
Bartzoudis et al., "Constraint-based test-scheduling of embedded microprocessors." 2008 Argentine School of Micro-Nanoelectronics, Technology and Applications. IEEE (2008): pp. 29-32.
Bentley, Bob. "Validating the Intel Pentium 4 Microprocessor," Proceedings of the 38th annual Design Automation Conference, (2001): 5 pages.
Cloud QA, "Manage Your Large and Complex Tests With Test Scheduler," https://cloudqa.io/test-scheduler/ (Retrieved Apr. 1, 2024), 3 pages.
Hrishikesh et al. "System Validation at ARM-Enabling our Partners to Build Better Systems." White Paper. Apr. 2016: 12 pages.
Khera, Vinod, "Cadence in Collaboration with Arm Ensures the Software Just Works," https://community.cadence.com/cadence_blogs_8/b/fv/posts/arm-leverages-cadence-for-pre_2d00_silicon-compliance-testing-to-ensure-that-software-just-works-across-arm_2d00_based-hardware (Retrieved Apr. 1, 2024), 12 pages.
Koo et al. "Automated micro-architectural test generation for validation of modern processors." Proc. of US-Korea Conference (UKC), (2007): 5 pages.
McCann, Eoin. "System Validation at ARM: Enabling our Partners to Build Better Systems," https://community.arm.com/arm-community-blogs/b/architectures-and-processors-blog/posts/system-validation-at-arm-enabling-our-partners-to-build-better-systems (Retrieved Apr. 1, 2024): 12 pages.
Microsoft Learn, "DTU benchmark" https://learn.microsoft.com/en-us/azure/azure-sql/database/dtu-benchmark?view=azuresql (Retrieved Apr. 1, 2024): 6 pages.
Microsoft Learn, "Microsoft Validation OS," https://learn.microsoft.com/en-us/windows-hardware/manufacture/desktop/validation-os-overview?view=windows-11, (Retrieved Apr. 1, 2024), 1 page.
Microsoft Learn, "Microsoft Validation OS," https://learn.microsoft.com/en-us/windows-hardware/manufacture/desktop/validation-os-overview?view=windows-11, (Retrieved Apr. 1, 2024), 1 page.
No Author "Green thread in general", Wikipedia—The Free Encyclopedia, Mar. 2, 2026, 01 page, https://en.wikipedia.org/wiki/Green_thread_in_general.

* cited by examiner

Traditional Random generation validation tool flow

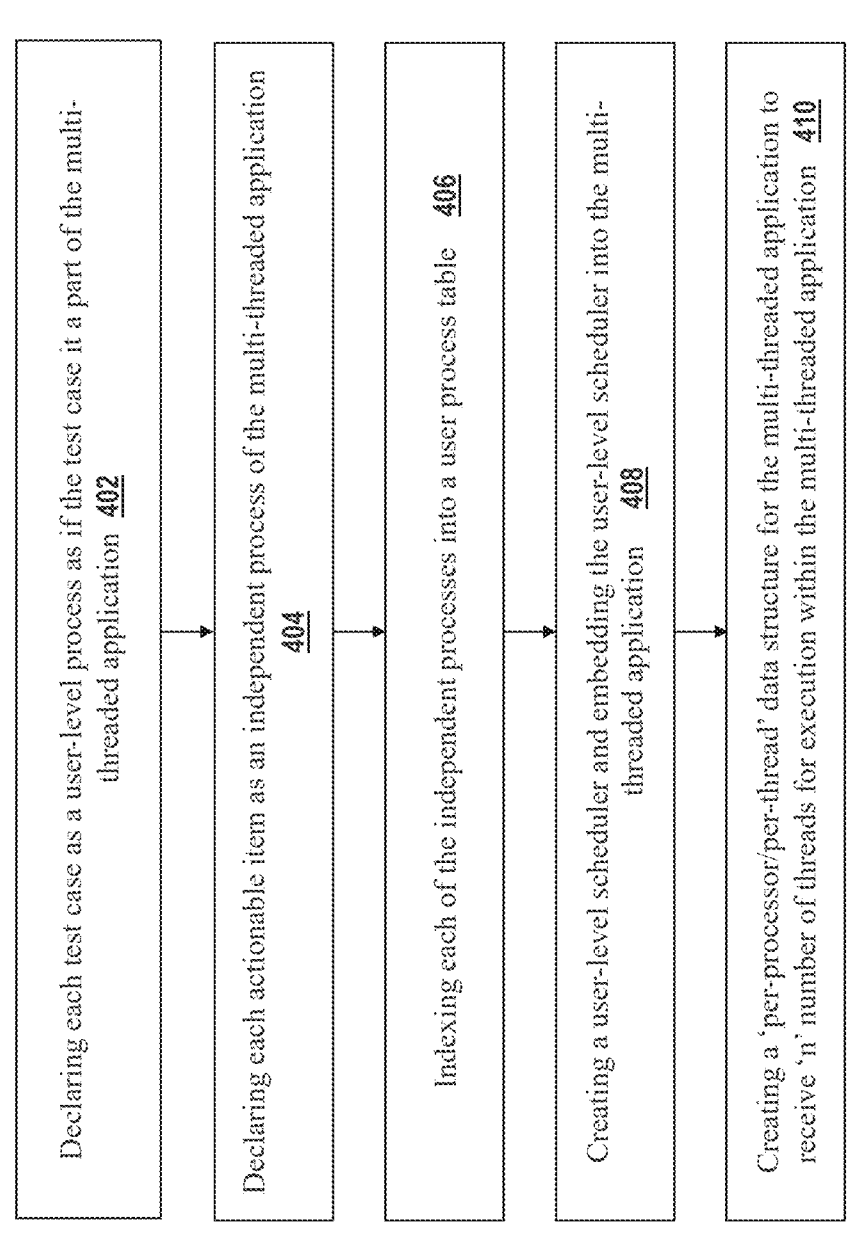

Declaring each test case as a user-level process as if the test case it a part of the multi-threaded application 402

Declaring each actionable item as an independent process of the multi-threaded application 404

Indexing each of the independent processes into a user process table 406

Creating a user-level scheduler and embedding the user-level scheduler into the multi-threaded application 408

Creating a 'per-processor/per-thread' data structure for the multi-threaded application to receive 'n' number of threads for execution within the multi-threaded application 410

FIG. 3

```
void store_bw (uint64_t *addr)
{ for (int i = 0; i < 4096; i++) {
    *(addr + (i * 16)) = 0xCOFFEEull;
}

} int main (int argc, char argv [ ] )
{ uint64_t *addr = 0x40000000;
for (int i = 0; i < 4096; i++) {
    uint64_t v = *(addr + (i * 16));
} store_bw (addr);

return 0;

}
```

460 Processes / Workloads pointer chasing matrix multiplication streaming daxpy memory bandwidth BLAS workload TPSM or other exerciser TC load/store atomicity 450 Process Table

| 0 |
| 1 |
| 2 |
| 3 |
| 4 |
| 5 |
| 6 |
| ... |
| P |

100

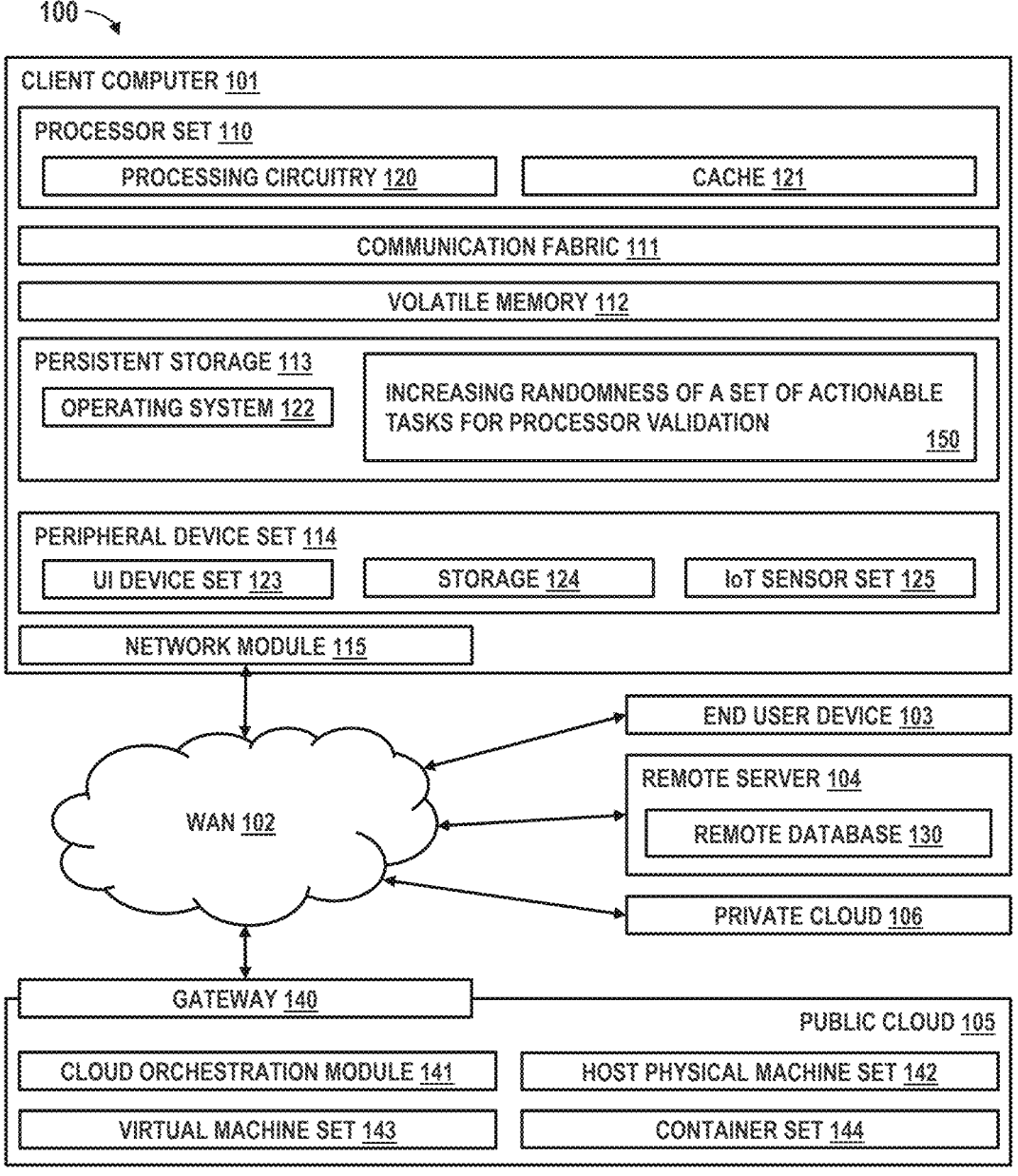

CLIENT COMPUTER 101

PROCESSOR SET 110

PROCESSING CIRCUITRY 120      CACHE 121

COMMUNICATION FABRIC 111

VOLATILE MEMORY 112

PERSISTENT STORAGE 113

OPERATING SYSTEM 122

INCREASING RANDOMNESS OF A SET OF ACTIONABLE TASKS FOR PROCESSOR VALIDATION 150

PERIPHERAL DEVICE SET 114

UI DEVICE SET 123      STORAGE 124      IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141      HOST PHYSICAL MACHINE SET 142

VIRTUAL MACHINE SET 143      CONTAINER SET 144

FIG. 8

MICROPROCESSOR VALIDATION USING RANDOM PREPACKAGED GENERATED TEST FUNCTIONS AND USER LEVEL SCHEDULER

BACKGROUND

The present invention generally relates to microprocessor validation, and more particularly, to a method of microprocessor validation using packaged functions and a user level scheduler built into a software application.

As the focus on High Design Quality (HDQ), higher efficiency and less Hardware (HW) resource usage increases, one challenging issue when validating a microprocessor involves the efficiency of run time. As such, validation tools need to increase execution time and decrease non-bug-finding paths like test generation, results checking time, etc. Current methods of validation typically include a) generating a ratio of generation/execution where the ratio is skewed towards generation for every 'n' number of test cases on a Device Under Test (DUT), and b) generating large test packages offline and executing the test packages. Unfortunately, the current methods require executing the test packages for a long time and includes the challenge of image size, which causes long load times thereby creating a low load/execution efficiency. Moreover, as executing test packages typically include running billions of cycles, offline generated test packages become saturated, especially on actual hardware (HW).

SUMMARY

A method of microprocessor validation using random generated test functions includes creating a plurality of actionable items in a system memory for execution by multiple hardware threads, creating a Hardware Thread Table Structure (HTTS) in the system memory, wherein the hardware thread table structure contains the multiple hardware threads, creating a Process Table Structure (PTS) table in the system memory, where the PTS table includes entry points into the plurality of actionable items, creating a re-entrant entry point function (FSCHED) in the system memory, where the FSCHED is configured to allow the multiple hardware threads to enter the plurality of actionable items, inspecting each of the plurality of actionable items to identify an inactive actionable item, where, if an inactive actionable item is not identified, the FSCHED continues searching for an inactive actionable item, and if an inactive actionable item is identified, the FSCHED atomically locks the inactive actionable item and a hardware thread from the multiple hardware threads enters the inactive actionable item and executes the inactive actionable item until finished, where the FSCHED locks the inactive actionable item and continues searching for other inactive actionable items.

Embodiments of the invention are also directed to computer-implemented methods and computer program products having substantially the same features and functionality as the computer system described above.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3 is a functional block diagram illustrating a method for declaring each actionable item as a user-level process, in accordance with one or more embodiments of the present invention;

FIG. 8 is a block diagram of an example computer system for use in accordance with one or more embodiments of the present invention.

DETAILED DESCRIPTION

As discussed briefly above, the present invention relates to a method for validating a microprocessor using packaged functions and a user level scheduler built into a software application.

As discussed briefly above, the focus on HDQ and a higher testing efficiency with less HW resource usage presents a challenge involving the issue of run time when validating a microprocessor. As such, validation tools need to increase execution time while decreasing non-bug-finding paths like test generation and results checking time. Unfortunately, current methods require executing the test packages for a long time and includes the challenge of image size, which causes long load times and also long generation times thereby creating a low load/execution efficiency. Moreover, as executing online test generation test packages typically include running billions of cycles for test generation, offline generated test package methods are used. Offline generated test case packages become saturated, especially on actual hardware (HW).

For example, generator code for generating one test instruction for a DUT includes between 500 to 6k instructions per test case instruction generation depending on the complexity of the generation methodology. The number of structures that need to be accessed to generate instructions having the right constraints and dependencies could be up to approximately 64 data cache lines per every one instruction generation. And as each memory access is approximately 400 cycles and, on average the cache lines on the instruction side are typically between 64 and 256 bytes, this would mean that the costs become very large and end up polluting the cache and other buffers in the DUT. Thus, online generation has a huge overhead of instructions and data compared to actual test case instructions.

Figure 1:
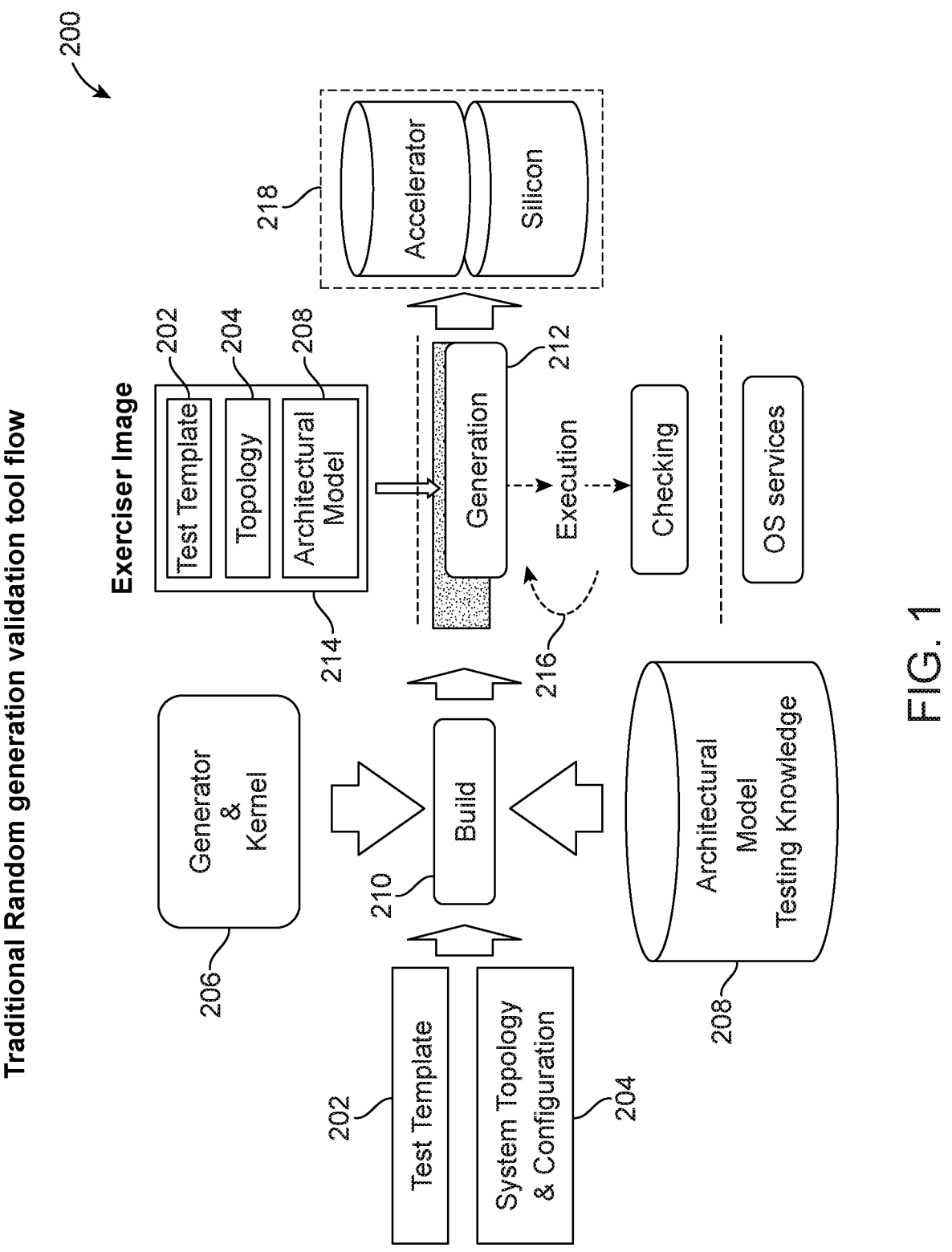
FIG. 1 is a block diagram of a traditional random generation validation tool flow.

Referring to FIG. 1, the traditional method 200 flow for a Random Generation Validation Tool is shown and includes receiving information from a test template 202, the system topology and configuration 204, the system kernel and test case generator 206 and the architectural model 208 with the knowledge to be tested. This information is combined and used to design a test case to be built 210, wherein the test case is generated 212 and includes the exerciser image 214 which includes the Test Template 202, the topology 204 and the architectural model 208. The test case is executed 216 and used to create variability in microarchitecture (Uarch) and architecture stress corners in a post silicon environment 218.

Figure 2:
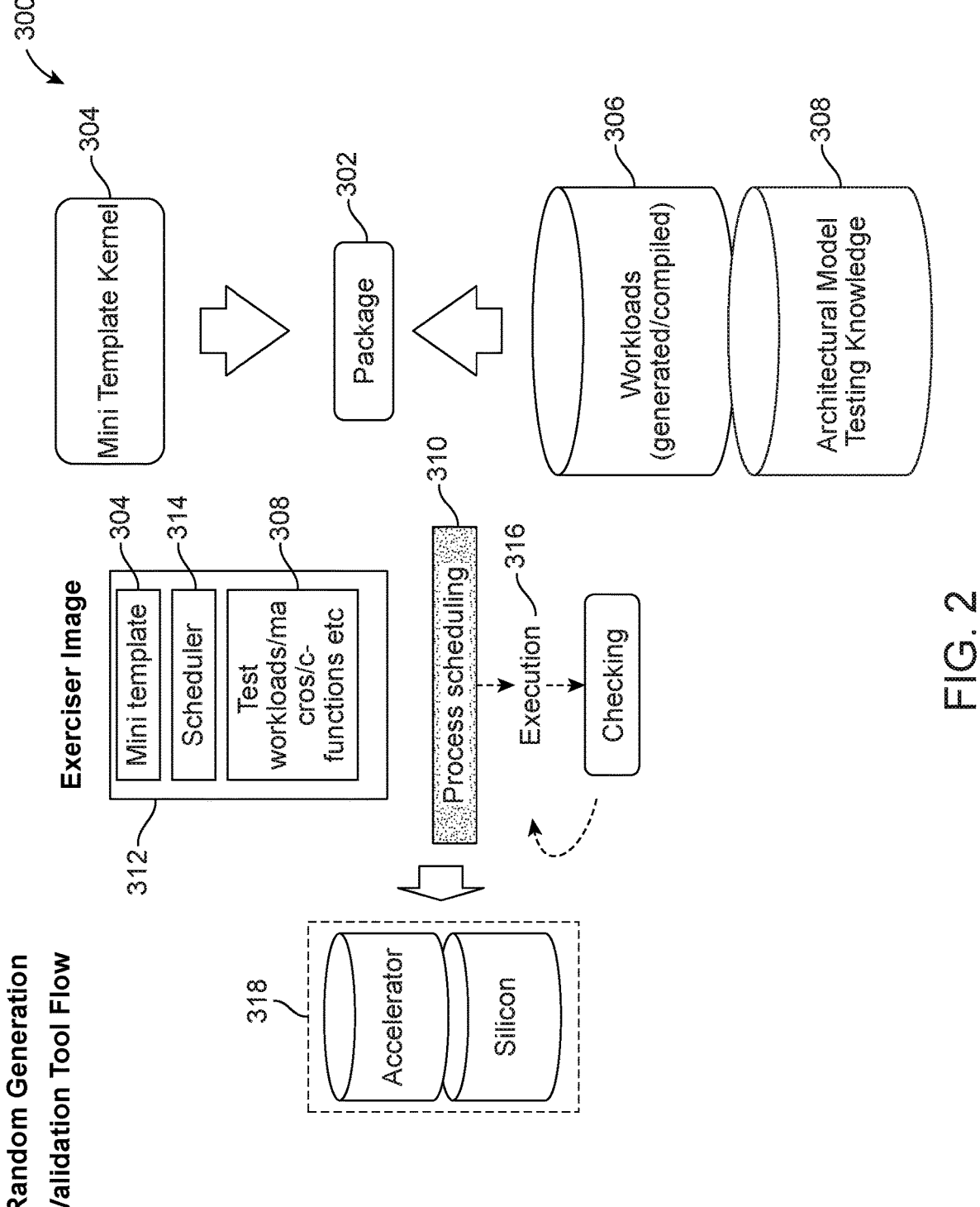
FIG. 2 is a block diagram of a random generation validation tool flow, in accordance with one or more embodiments of the present invention.

Referring to FIG. 2, a method 300 flow for a Random Generation Validation Tool, according to an embodiment, is shown and includes generating a test case package 302 using a system mini-template kernel 304, actionable items (such as workloads/macros/c-functions, etc.) 306, where the workloads have been generated and compiled, and an architectural model 308 with the knowledge to be tested. This information is combined and used to design a test case of the actionable items 306 and the process scheduling 310 for the test case package 302 is generated, wherein the test case package 302 includes the exerciser image 312 which includes information from the mini-Template 304, a scheduler 314 and the actionable items. The test case package 302 is executed 316 and used to create variability in microarchitecture (Uarch) and architecture stress corners in a post silicon environment 318.

Referring to FIG. 3, an embodiment of a method 400 for declaring each actionable item (such as test cases/workloads/macros/c-functions, etc.) as a user-level process as if the actionable item is part of the multi-threaded applications, as shown in operational block 402. Each actionable item (i.e., workload/macros/micro-functions/c functions/test cases/library functions, etc.) are declared as an independent process as part of the same multi-threaded application, as shown in operational block 404. The independent processes are then indexed with a pointer into a user PTS where the user PTS entry has an entry point and a process state flag (i.e., Running or Not Running), a stack pointer and a heap pointer, as shown in operational block 406. A user-level scheduler is created and embedded in the multi-threaded application, as shown in operational block 408. The user-level scheduler is configured to be "light weight" in that the scheduler does not perform save and restore, does not perform an OS call, does not have any context switching instructions, has less than 100 instructions in scheduling the next process and is custom built for the specific application.

Each HW thread/processor executes a multi-threaded application listed in the user PTS, where each HW thread enters a unique Per Hardware Thread Data Area (PHTDA). As each thread enters the PTS scheduler code, the processor will either schedule a process or yield the thread. Moreover, each thread will check the flag in the user PTS and pick up a free slot (not running) entry which is one process (i.e., macro/micro-function/c-function/test case, etc.). The processor will change the flag to "running" and the entry point will be locked and the thread will be jumped to the entry point of the process, where the process will be executed until the process ends. Once the process ends, the thread will be returned to the scheduler code and the entry will be released and the thread will select a new process. A 'per-processor'/'per-thread' data structure is created for the multi-threaded application, as shown in operational block 410, where the data structure is embedded in the multi-threaded application and can receive up to 'n' number of threads to execute within the multi-threaded application. Moreover, the application is configured so that it may return the thread if the thread is not needed. It should be appreciated that leveraging the HW thread's inherent micro-architectural randomness and taking locks on user PTS entries creates randomness in test case execution on each of the HW threads thereby eliminating the need for re-generation of a test case.

Figure 4:
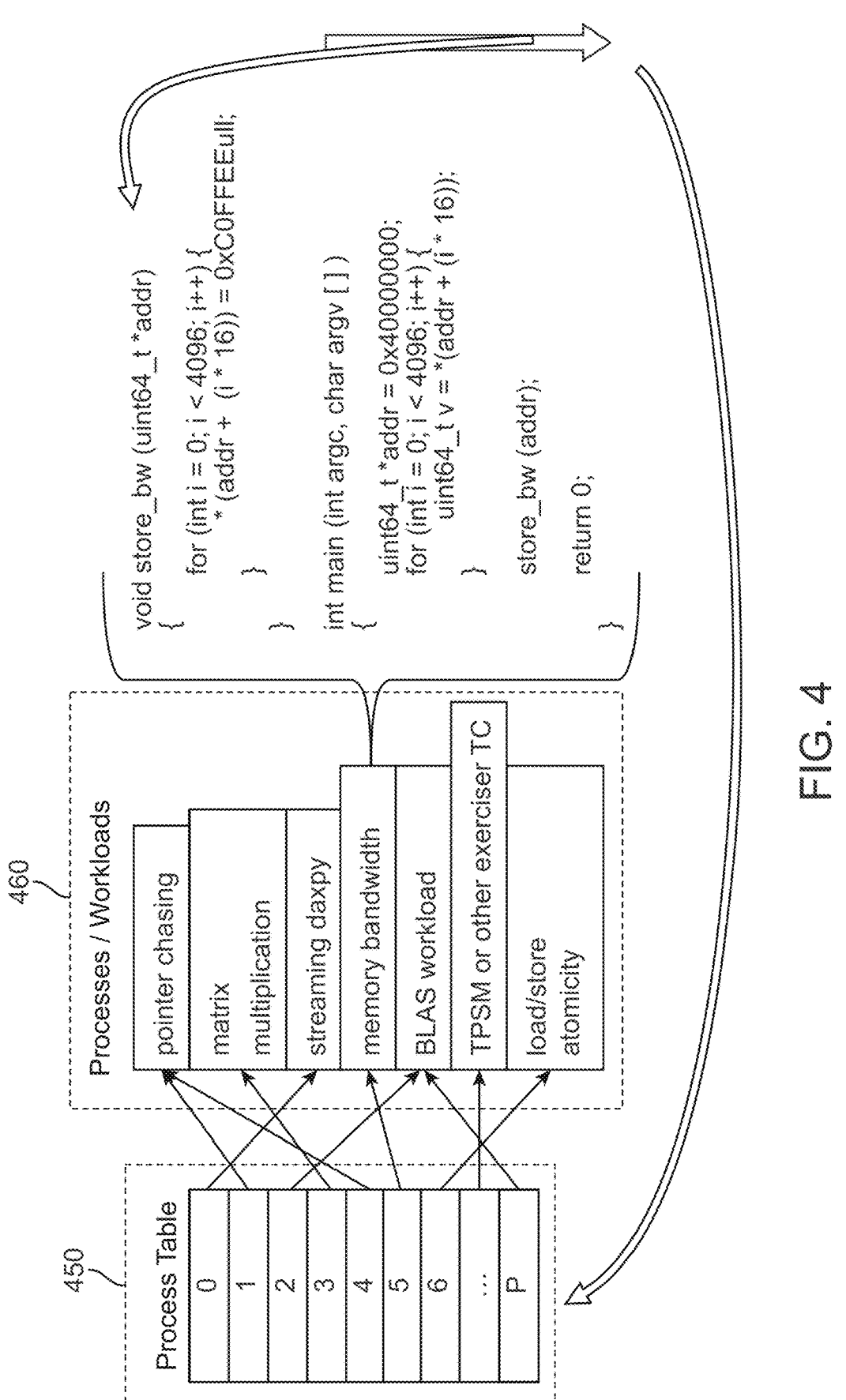
FIG. 4 is a block diagram illustrating a Process Table Structure (PTS) example, in accordance with one or more embodiments of the present invention.
Figure 5:
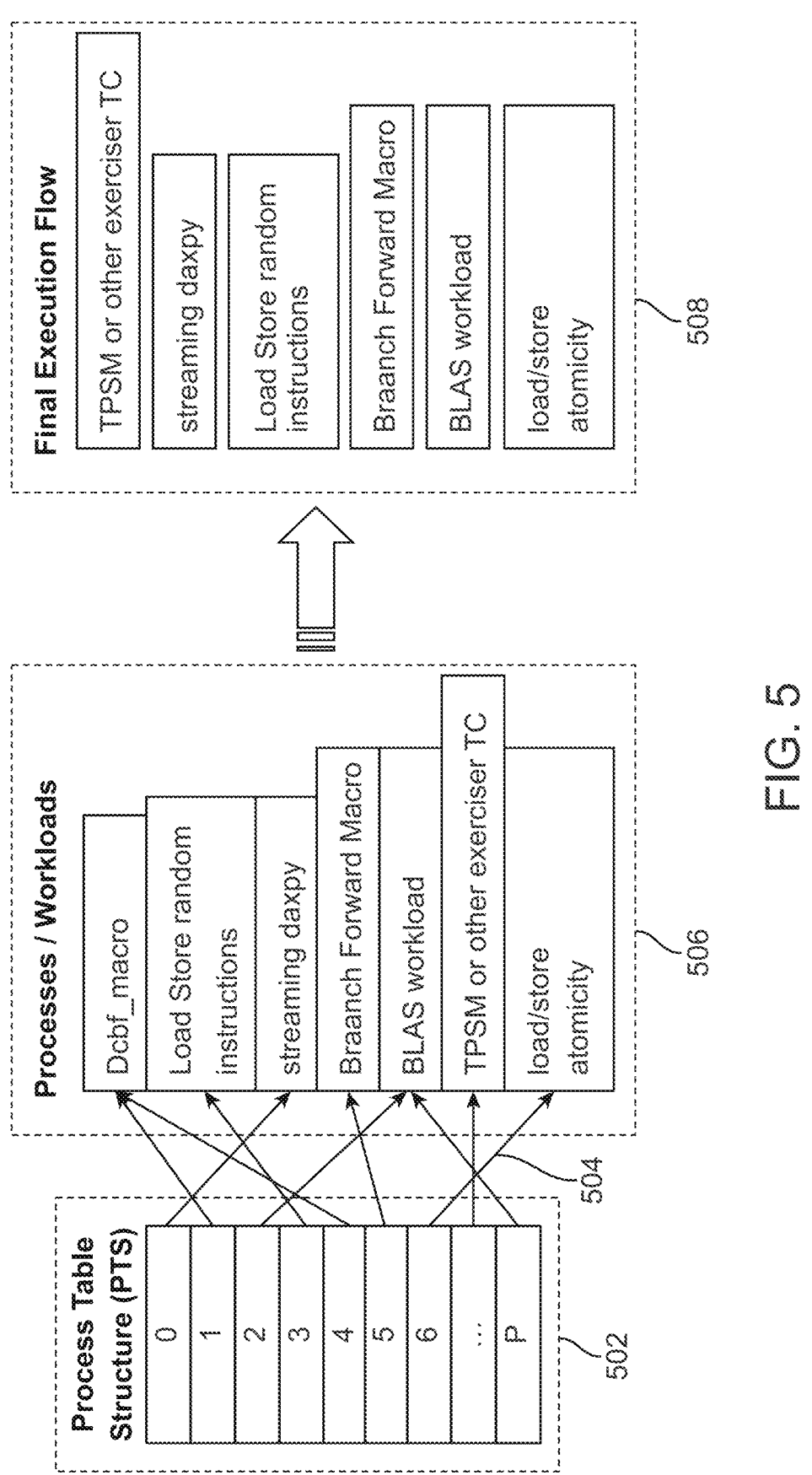
FIG. 5 is a block diagram illustrating a pApp flow of an execution of a test case from the PTS by HW threads in HTTS, in accordance with one or more embodiments of the present invention.

Referring to FIG. 4, process scheduling may be accomplished by assigning the PTS elements in the PTS table 450 to a process/workload 460 (i.e., actionable item) which runs to completion. Once the process/workload 460 is run to completion, the thread is returned to the scheduler and another process/workload 460 is executed to completion and the process is repeated. Referring to FIG. 5, an embodiment of the PTS table 502 includes a pointer 504 for each thread to an actionable item (i.e., processes/workloads, etc.) 506 to be executed, wherein the thread executes the actionable item 506 until the thread is finished 508.

Figure 6:
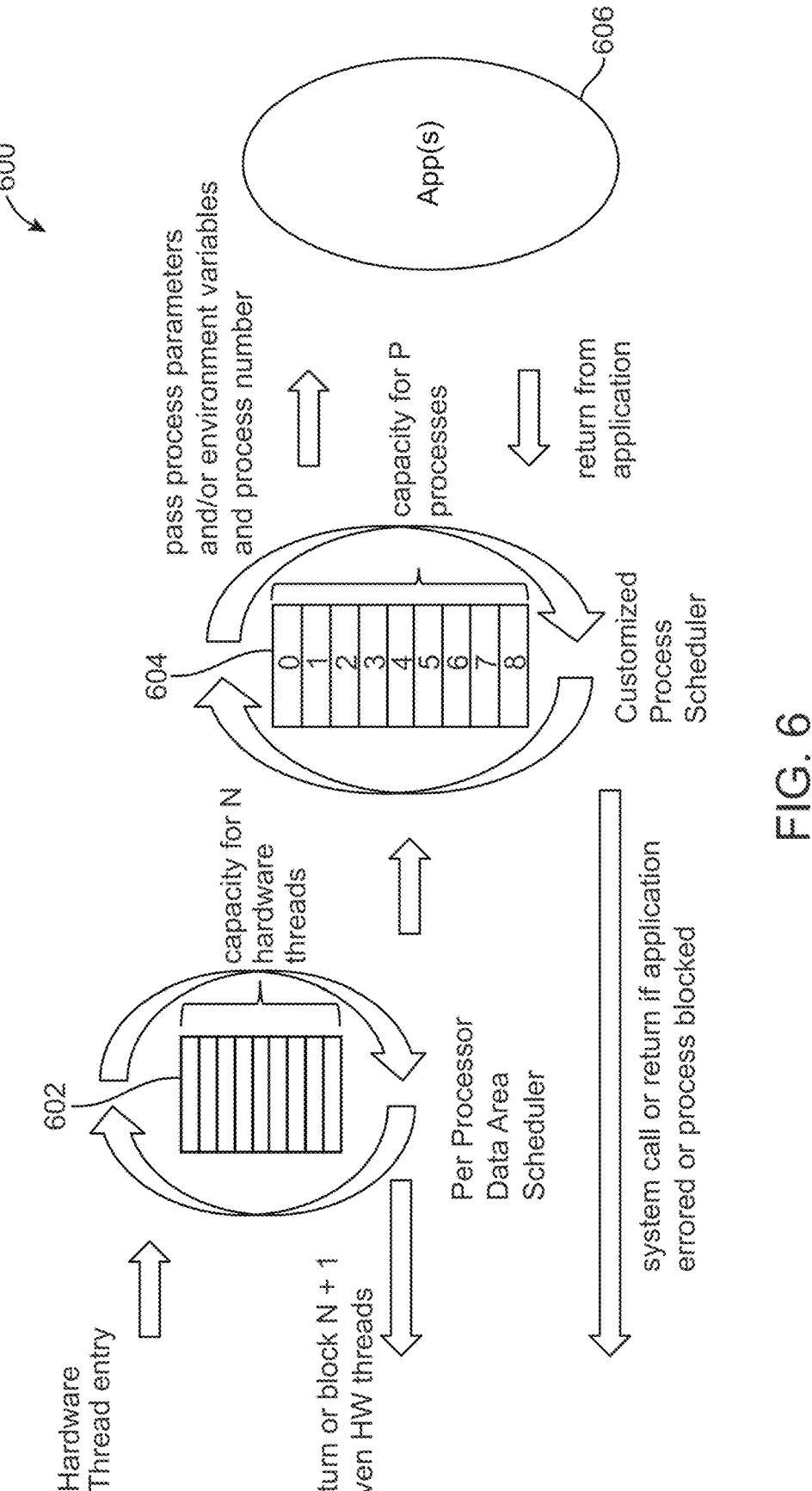
FIG. 6 is a block diagram illustrating a flow example of execution of PTS validation, in accordance with one or more embodiments of the present invention.

Referring to FIG. 6, a block diagram 600 illustrating an example of an execution flow of Validation workloads on a Device Under Test is shown for an independent number 'N' of hardware threads 602, wherein the N number of hardware threads 602 are introduced into a processor having a hardware thread table structure 604 for receiving and accommodating an N number of hardware threads 602. It should be appreciated that if the hardware threads 602 being introduced into the processor exceed the capacity of the hardware thread table structure 604 (i.e., N+1 hardware threads), then the N+1 hardware thread will be blocked from entering the hardware thread table structure 604 or the N+1 hardware thread will be returned. A Per Hardware Thread Data Area (PHTDA) scheduler 606 will determine which order the hardware threads 602 located within the hardware thread table structure 604 will be communicated to the PTS table 608 for processing. Once a hardware thread 602 is communicated to the PTS table 608, a user level customized process scheduler 610 will instruct the processor to begin the process and run the hardware thread 602 using a test case execution via multi-threaded applications 612 until the hardware thread 602 is finished.

It should be appreciated that, in this example, the N number of hardware threads are 8 hardware threads 602 and the PTS table 608 is capable of accommodating all of the 8 hardware threads for execution. However, in other embodiments, it is contemplated that the PTS table 608 may not be large enough to accommodate all of the N number of hardware threads 602 being introduced into the processor. In this case, the PTS table 608 will only be able to accommodate a portion of the N number of hardware threads 602 that is introduced. For instance, in this example, there may be 10 hardware threads 602 located within the hardware thread table structure 604, while the PTS table 608 may only be able to accommodate 8 hardware threads at a time. In this case, the remaining two (2) hardware threads 602 may be returned or blocked on a spin loop.

In accordance with an embodiment, the method of the invention which employs a user PTS without online generation allows for the user level scheduler to select micro test cases (degenerate case could be single instruction) in a random fashion by virtue of scheduling an algorithm to create similar randomness. Additionally, each workload that is compiled or assembled may be selected in a random order to create more register randomness. However, there is no overhead from the OS or a generator polluting caches and as such, in this embodiment, the cache line stress is targeted. The method of the invention can select any workload (i.e., library functions, C-functions, etc.) to create unlimited variability. Moreover, the tests may be symmetric or shared multiprocessing (SMP) across HTTS over the PTS, thereby further increasing the variability. Moreover, any multi-threaded coordinated workload can also be integrated and with the scheduler changes, can be scheduled together. Further, the scheduler (PTS) can be enhanced further and targeted for a particular type of stress on the microarchitecture.

Additionally, the method of the invention allows for scheduling processes (micro test cases) to occur without the need for Context Switching to save and restore as each actionable item is run to completion. Thus, for all practical purposes, the test cases are of an infinite length thereby increasing the stress on micro-architecture pipes. While branches methodology can only address single processor micro-architecture length of the tests and thus stress, user-level scheduling of micro-components can create variability and stress across processors, as user the level scheduler intakes multiple processors/threads as an entry. User level scheduling does not preclude the branches methodology. Additionally, the OS can time slice these user-level scheduling tests independently using a timer interrupt. In the method of the invention, each process is self-contained and non-preemptive, thereby removing any requirement for a save and restore action. Furthermore, the user level scheduler does not preclude existing OS level schedulers.

In an embodiment, a method of packaging generated test cases (i.e., workloads, traces, functions, etc.) as individual processes and using a user level scheduler to create variability in microarchitecture (Uarch) and architecture stress corners in a post silicon environment is provided. The method employs a "user level scheduler" to create variability and to avoid context switching. Moreover, to amortize the cost of generation, generated test packages were scheduled in a different order responsive to the nature of cores' execution timing. The method of the invention is not just for functional validation, but also for performance too. Moreover, the method allows a new user to introduce their workloads and their scheduler to use the generated test package in their environment because there is no generator. Once generated, the generated test package can run in different environments like simulation, wafer, module, Hardware, etc., without the need of an OS or the need to recompile and/or re-generate.

Additionally, in an embodiment, the user level scheduler can coexist and cooperate with other workloads bare-metal, or may run on firmware, or may run as a user application on an OS. Intelligence programmed into the user level scheduler creates an almost infinite number of combinations of sequences of these functions or workloads in the same package, so all possible sequences of the functions in a target area may be accessed. This allows for a very high Execution/Generation (e.g., deliberate testing without regeneration of testcases) efficiency ratio, and will use much fewer cycles to get greater coverage. Accordingly, there may be no limitation on the workload type (workload types can be large C-functions/micro-functions, macros, random test cases, whole applications, etc.) and can be run in any processor mode (i.e., user/OS/Hypervisor).

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as for increasing randomness of a set of actionable tasks for processor validation 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 8. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

One or more embodiments described herein can utilize machine learning techniques to perform tasks. More specifically, one or more embodiments described herein can incorporate and utilize rule-based decision making and artificial intelligence (AI) reasoning to accomplish the various operations described herein, namely containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input. It should be appreciated that these same techniques can be applied in the case of containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Figure 7:
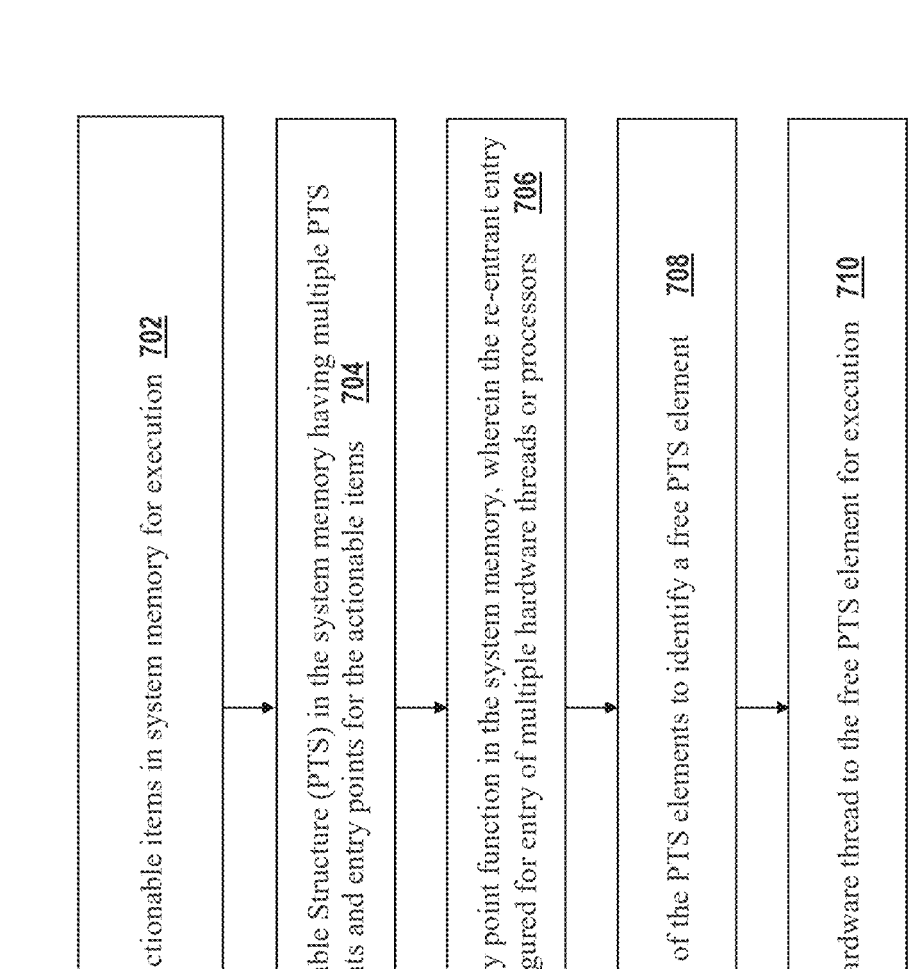
FIG. 7 is a block diagram illustrating a method of microprocessor validation using random generated test functions, in accordance with one or more embodiments of the present invention.

In accordance with an embodiment, a method 700 of microprocessor validation using random generated test functions is provided, as shown in FIG. 7. The method 700 includes laying out the actionable item tasks for execution in system memory, as shown in operational block 702 and creating a hardware thread table structure in the system memory, wherein the hardware thread table structure is configured to receive and contain the multiple hardware threads received by the processor for processing, as shown in operational block 704. The method also includes creating a process table structure (PTS table) in the system memory, wherein the PTS table includes one or more PTS elements, as shown in operational block 706. The method 700 further includes creating a re-entrant entry point function (FSCHED) in the memory, as shown in operational block 708, wherein the FSCHED is a entry point for multiple hardware threads and/or processors to enter the actionable tasks. The method 700 further includes inspecting each PTS element to identify a free PTS element, as shown in operational block 710, where if a free PTS element is identified, the free PTS element is atomically locked to make the PTS element unavailable to other hardware threads. The hardware thread then is directed to the entry point of the free PTS element and executes the relevant actionable task until the task is finished and returned, as shown in operational block 712. The FSCHED then unlocks the PTS element and continues to search for additional free PTS elements in the PTS table, where upon identifying an additional free PTS element, the method 700 is repeated.

In an embodiment, the method 700 declares workloads as processes by creating a minimal context with practically no save/restore actions required. The method 700 uses a PTS that runs in user mode, thereby negating the requirement to create branches, thereby avoiding the OS cost of a system call. The OS can schedule the whole package if needed, is self-contained and can schedule its own processes, where the PTS is executed on a multi-processor to avoid uni-processor bias.

It should be appreciated that the invention may be embodied in a software application that is configured to practice the method of microprocessor validation using random generated test functions. In an embodiment, the software application may be resident on an external device (e.g., flash drive, remote server, external hard drive, etc.) and may be implemented from the external device. In another embodiment, the software application may be resident on an internal system device (e.g., system memory, internal hard drive, etc.) and may be implemented either as part of an operating system or separate from an operating system.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein. Moreover, the embodiments or parts of the embodiments may be combined in whole or in part without departing from the scope of the invention.

What is claimed is:

1. A method of microprocessor validation using random generated test functions, the method comprising:
 creating a plurality of actionable items in a system memory for execution by multiple hardware threads;
 creating a hardware thread table structure in the system memory, wherein the hardware thread table structure contains the multiple hardware threads;
 creating a Process Table Structure (PTS) table in the system memory, wherein the PTS table includes entry points into the plurality of actionable items;
 creating a re-entrant entry point function (FSCHED) in the system memory, wherein the FSCHED is configured to allow the multiple hardware threads to enter the plurality of actionable items;
 inspecting each of the plurality of actionable items to identify an inactive actionable item, wherein,
  based on a determination that an inactive actionable item is not identified, the FSCHED continues searching for an inactive actionable item, and
  based on a determination that an inactive actionable item is identified, the FSCHED atomically locks the inactive actionable item and a hardware thread from the multiple hardware threads enters the inactive actionable item and executes the inactive actionable item until finished, where the FSCHED locks the inactive actionable item and continues searching for other inactive actionable items.

2. The method of claim 1, wherein the plurality of actionable items includes test cases, independent sub-test cases, macros, workloads, micro-functions, c-functions and library functions.

3. The method of claim 1, wherein creating a plurality of actionable items includes declaring each actionable item as an independent, user-level process which is a part of a multi-threaded application.

4. The method of claim 3, wherein creating a plurality of actionable items includes creating a user-level scheduler configured for the multi-threaded application.

5. The method of claim 4, wherein if an inactive actionable item is identified the user-level scheduler will cause the FSCHED to change a process state flag to 'running' prior to atomically locking the inactive actionable item.

6. The method of claim 5, wherein if an inactive actionable item is identified, the FSCHED will direct the hardware thread to an entry point of the inactive actionable item located within the PTS table.

7. The method of claim 6, wherein when the inactive actionable item is finished, the hardware thread will be returned to the user-level scheduler and the inactive actionable item will be atomically unlocked.

8. A computing system, comprising:
 a processor configured to perform operations for microprocessor validation using random generated test functions, the operations comprising:
 creating a plurality of actionable items in a system memory for execution by multiple hardware threads;
 creating a hardware thread table structure in the system memory, wherein the hardware thread table structure contains the multiple hardware threads;
 creating a Process Table Structure (PTS) table in the system memory, wherein the PTS table includes entry points into the plurality of actionable items;
 creating a re-entrant entry point function (FSCHED) in the system memory, wherein the FSCHED is configured to allow the multiple hardware threads to enter the plurality of actionable items;
 inspecting each of the plurality of actionable items to identify an inactive actionable item, wherein,
  based on a determination that an inactive actionable item is not identified, the FSCHED continues searching for an inactive actionable item, and
  based on a determination that an inactive actionable item is identified, the FSCHED atomically locks the inactive actionable item and a hardware thread from the multiple hardware threads enters the inactive actionable item and executes the inactive actionable item until finished, where the FSCHED locks the inactive actionable item and continues searching for other inactive actionable items.

9. The computing system of claim 8, wherein the plurality of actionable items includes test cases, independent sub-test cases, macros, workloads, micro-functions, c-functions and library functions.

10. The computing system of claim 8, wherein creating a plurality of actionable items includes declaring each actionable item as an independent, user-level process which is a part of a multi-threaded application.

11. The computing system of claim 10, wherein creating a plurality of actionable items includes creating a user-level scheduler configured for the multi-threaded application.

12. The computing system of claim 11, wherein if an inactive actionable item is identified the user-level scheduler will cause the FSCHED to change a process state flag to 'running' prior to atomically locking the inactive actionable item.

13. The computing system of claim 12, wherein if an inactive actionable item is identified, the FSCHED will direct the hardware thread to an entry point of the inactive actionable item located within the PTS table.

14. The computing system of claim 13, wherein when the inactive actionable item is finished, the hardware thread will be returned to the user-level scheduler and the inactive actionable item will be atomically unlocked.

15. A computer program product comprising a computer readable storage medium having program instructions embodied therewith, the program instructions executable by a processor to cause the processor to perform operations for microprocessor validation using random generated test functions, the operations comprising:

creating a plurality of actionable items in a system memory for execution by multiple hardware threads;

creating a hardware thread table structure in the system memory, wherein the hardware thread table structure contains the multiple hardware threads;

creating a Process Table Structure (PTS) table in the system memory, wherein the PTS table includes entry points into the plurality of actionable items;

creating a re-entrant entry point function (FSCHED) in the system memory, wherein the FSCHED is configured to allow the multiple hardware threads to enter the plurality of actionable items;

inspecting each of the plurality of actionable items to identify an inactive actionable item, wherein, based on a determination that an inactive actionable item is not identified, the FSCHED continues searching for an inactive actionable item, and based on a determination that an inactive actionable item is identified, the FSCHED atomically locks the inactive actionable item and a hardware thread from the multiple hardware threads enters the inactive actionable item and executes the inactive actionable item until finished, where the FSCHED locks the inactive actionable item and continues searching for other inactive actionable items.

16. The computer program product of claim 15, wherein the plurality of actionable items includes test cases, independent sub-test cases, macros, workloads, micro-functions, c-functions and library functions.

17. The computer program product of claim 15, wherein creating a plurality of actionable items includes declaring each actionable item as an independent, user-level process which is a part of a multi-threaded application.

18. The computer program product of claim 17, wherein creating a plurality of actionable items includes creating a user-level scheduler configured for the multi-threaded application.

19. The computer program product of claim 18, wherein if an inactive actionable item is identified, the user-level scheduler will cause the FSCHED to change a process state flag to 'running' prior to atomically locking the inactive actionable item, and the FSCHED will direct the hardware thread to an entry point of the inactive actionable item located within the PTS table.

20. The computer program product of claim 19, wherein when the inactive actionable item is finished, the hardware thread will be returned to the user-level scheduler and the inactive actionable item will be atomically unlocked.

* * * * *